Dec. 9, 1958     O. DORFMAN     2,863,370
BOX FORMING MACHINE
Filed May 25, 1955     9 Sheets-Sheet 4

INVENTOR.
OSKAR DORFMAN
BY
ATTORNEYS

Dec. 9, 1958 O. DORFMAN 2,863,370
BOX FORMING MACHINE
Filed May 25, 1955 9 Sheets-Sheet 5
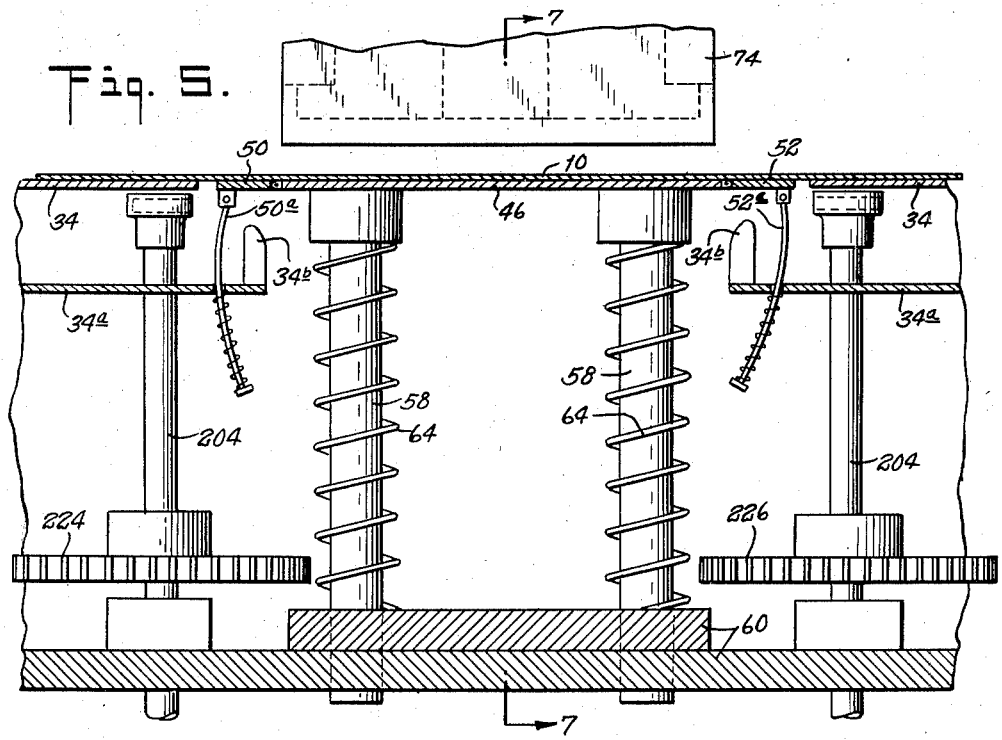
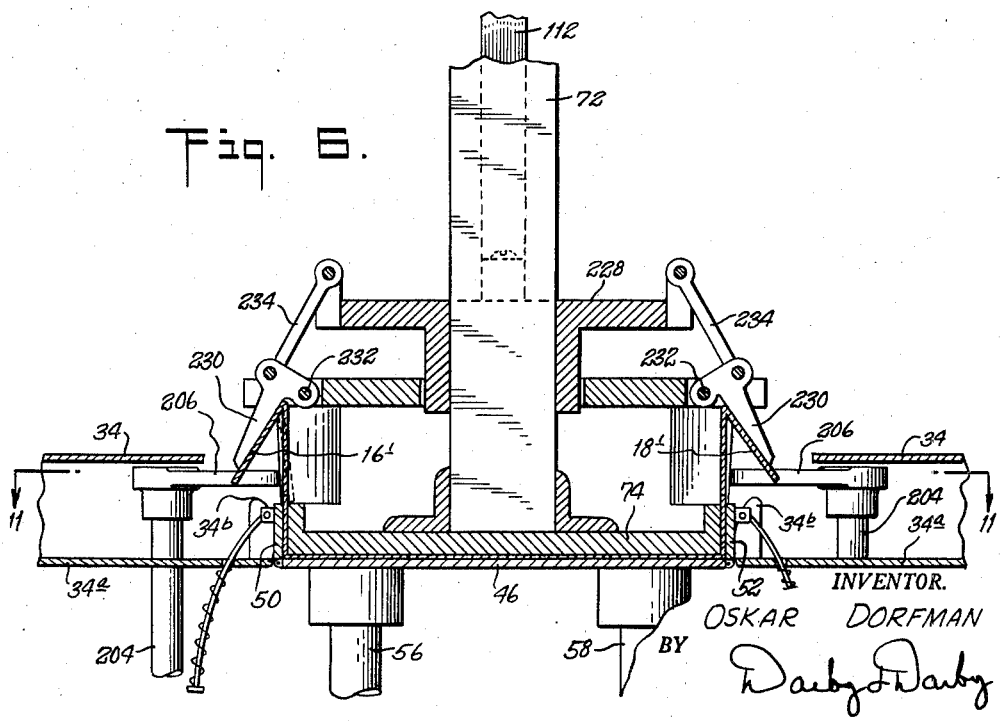
INVENTOR.
OSKAR DORFMAN
BY
ATTORNEYS

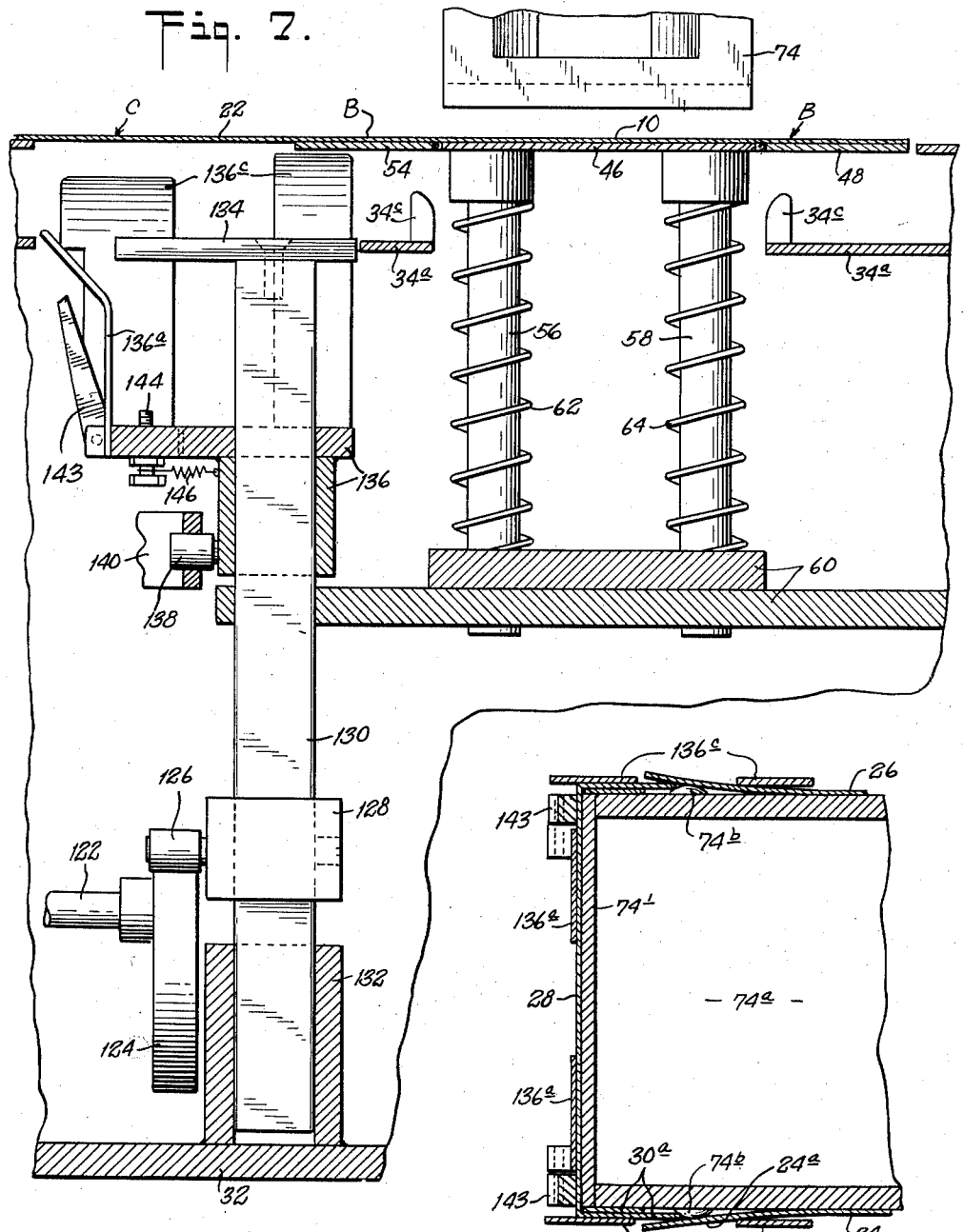

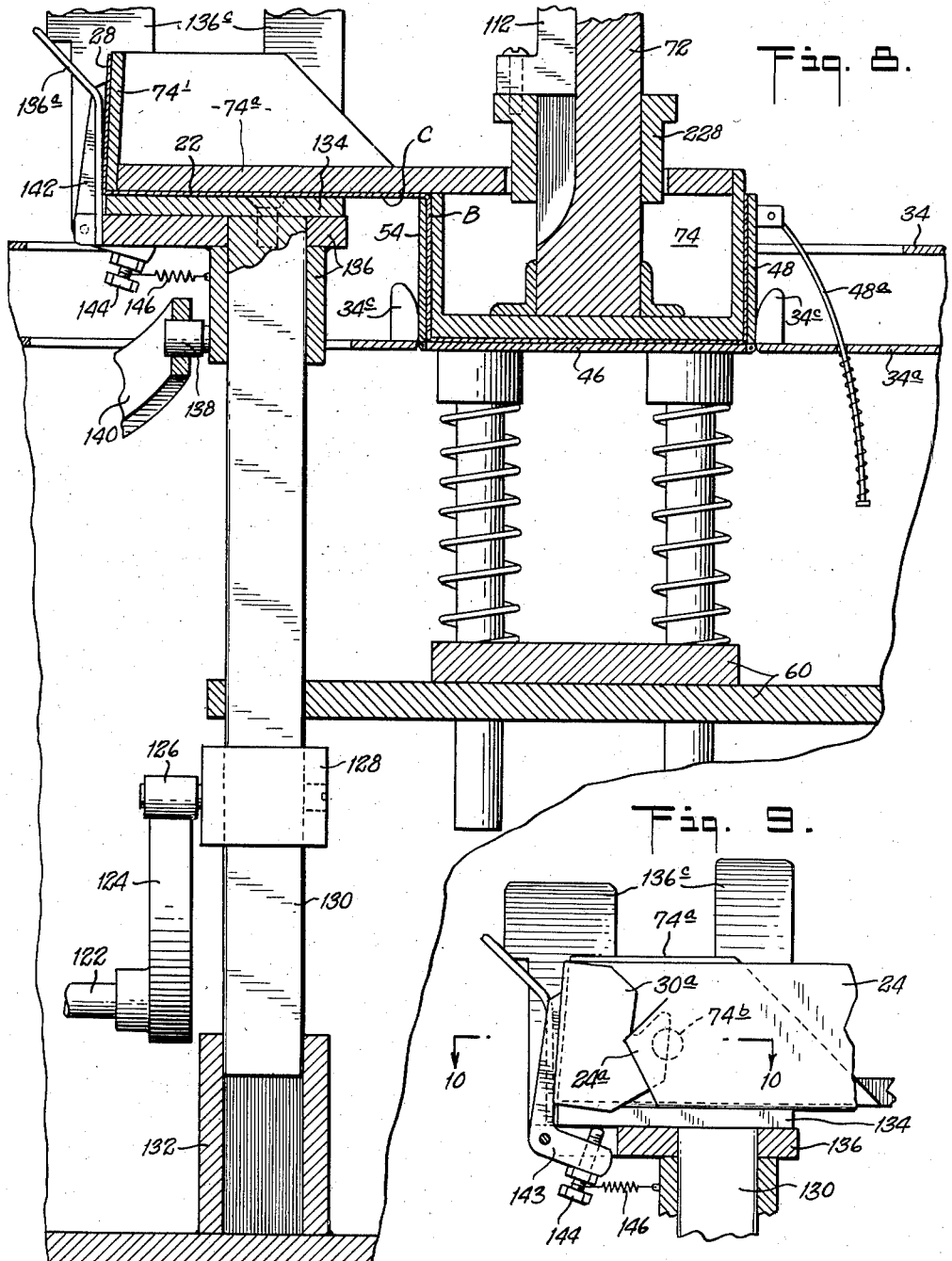

Dec. 9, 1958     O. DORFMAN     2,863,370
BOX FORMING MACHINE
Filed May 25, 1955     9 Sheets-Sheet 8

INVENTOR.
OSKAR DORFMAN
BY
Darby & Darby
ATTORNEYS

Dec. 9, 1958     O. DORFMAN     2,863,370
BOX FORMING MACHINE

Filed May 25, 1955                          9 Sheets-Sheet 9

INVENTOR.
OSKAR DORFMAN
BY
ATTORNEYS

2,863,370

BOX FORMING MACHINE

Oskar Dorfman, North Bergen, N. J., assignor to Federal Carton Corporation, a corporation of New York Application May 25, 1955, Serial No. 511,071

7 Claims. (Cl. 93—49)

This invention consists of a fully automatic machine for folding and setting up a box from a single blank of box material.

The general object of this invention is to provide a fully automatic machine for folding a single piece box blank to completely set it up for use.

More detailed objects of the invention are concerned with the various features of the machine, whereby the complete operation of forming a box blank into a box is effected.

In the accompanying drawings, in which one embodiment of the invention is illustrated, Figure 1 is a front elevational view of the machine;

Figure 5 is a cross-sectional view taken on the line 5—5 of Figure 4;

Figure 6 is a vertical, central, transverse, sectional view through the male forming member or ram;

Figure 7 is a cross-sectional view taken on the line 7—7 of Figure 5;

Figure 8 is a cross-sectional view similar to Figure 6, but taken at right angles thereto;

Figure 9 is an enlarged detail view of the female and male portions at the end of the operation, illustrating the interlocking of the rear wall of the box cover with the adjacent side walls;

Figure 10 is a cross-sectional view taken on the line 10—10 of Figure 9;

Figure 13:
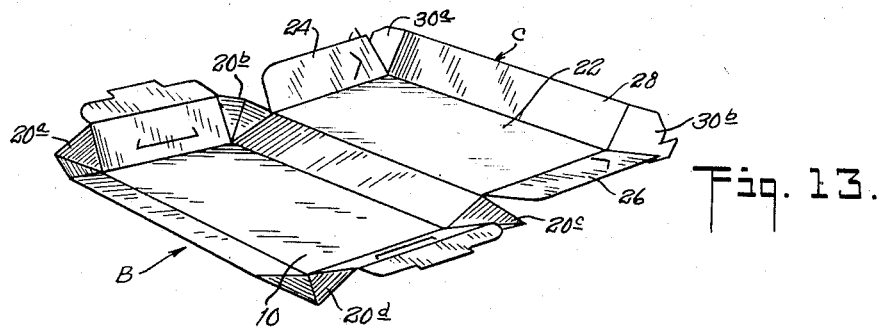
Figures 13, 14, 15 and 16 are perspective views showing the box in progressive stages of folding.

The operation of this machine will be better understood by describing first the nature of the box blank and the manner in which the various parts are moved from a planar condition into final three-dimensional form. Figure 13 shows the box blank in an early stage of folding. The blank at the beginning of the operation is a single flat sheet of fibrous material being imperforate in the areas which form the box corners. Reference to several of the figures, as for example Figure 7, will show that the box blank at the beginning is a plain sheet of material.

The blank is provided with score lines to provide a series of defining areas, illustrated in Figures 13 to 16 inclusive. The finished box consists of a body or main portion B and a cover C. The body portion B includes a bottom wall 10 having integral extensions on each side to form the side walls of the body portion. The front side wall is found at 12, the rear side wall at 14, and the end walls at 16 and 18. The end walls in turn have integral extensions 16' and 18', also defined by score lines. The front side wall 12 has no extension. The front and rear side walls and the end walls are interconnected by integral sections 20ª, 20ᵇ, 20ᶜ and 20ᵈ, which are generally triangular and have a score line along the altitude of the triangle to subdivide each triangle into two small triangles, as is clear from Figure 13. The end wall extensions 16' and 18' have projecting tabs 16ᵇ and 18ᵇ adapted to be locked in at the slits 16ª and 18ª of the respective end walls.

The cover C consists of a top wall 22 integral with the rear wall 14. The top wall 22 in turn has a side extension 28 and a pair of end extensions 24 and 26. The walls 28 and 24 and 26 are interconnected by extensions 30ª and 30ᵇ of the wall 28 which are integral with that wall and defined by a single score line. The extensions 30ª and 30ᵇ are not integral with the walls 24 and 26, as is clear from Figure 14. At the ends of the extensions 30ª and 30ᵇ are hooked shaped configurations the details of which are clearly shown in Figure 9. These hooked shaped configurations are adapted to be inserted behind flaps 24ª, Figure 9, formed by angular slits shown in the various figures.

Figure 14:
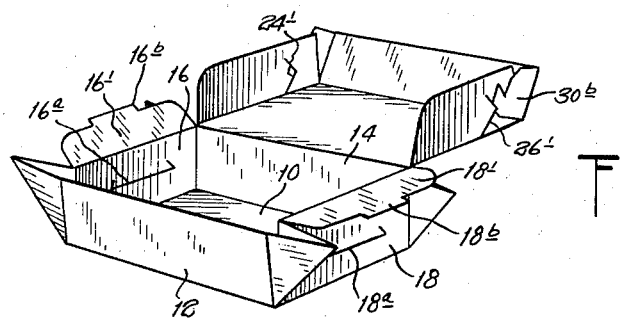
Figure 15:
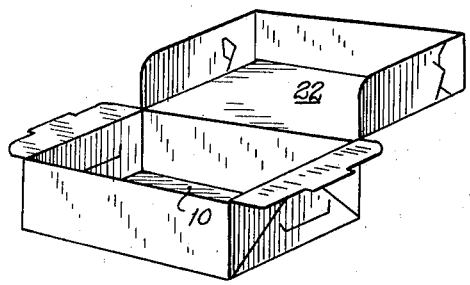

As illustrated in Figure 14, the integral triangular areas 20ª, 20ᵇ, 20ᶜ and 20ᵈ are adapted to be folded into contact and around the ends of the body B of the box so as to be locked under the end wall extensions 16' and 18' when completely folded. When so folded, the locking tabs 16ᵇ and 18ᵇ are snapped into the slits 16ª and 18ª, as clearly shown in Figure 16. When completely folded the walls of the body portion B lie at right angles to the bottom wall 10 and to each other. Similarly, the extensions of the top wall 22 are folded in right angle relation thereto and to each other and are interlocked. Thus, at the completion of the operation a completely form-sustaining box is provided having a main body portion B and a hinged integral cover C.

Figure 1:
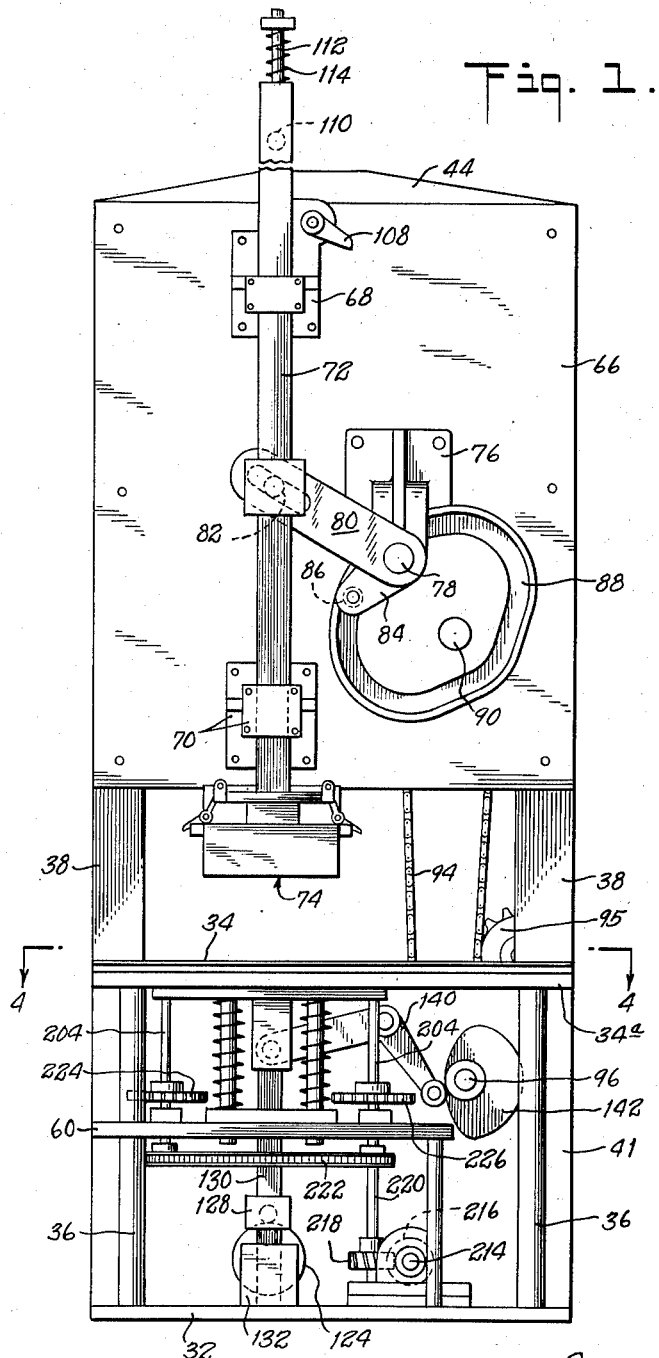
Figure 3:
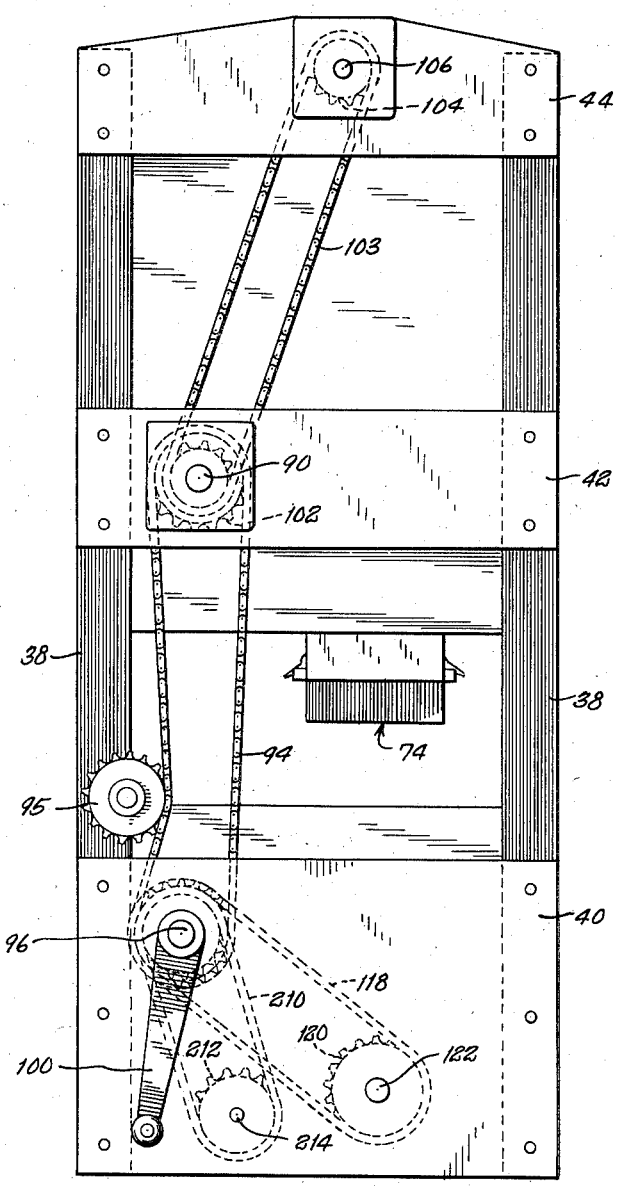
Figure 3 is a rear elevational view thereof.

Referring now to the mechanism for folding a blank of this nature, it is shown in the drawings as having a base plate 32 and a parallel vertically spaced plate 34ª connected to the base plate at the front by a pair of standards 36, see Figure 1. These plates are held in spaced relation at the rear of the machine by the pair of corner columns 38, which as shown in Figure 3, are cross-connected by framing plates 40, 42 and 44. Supported parallel to the upper plate 34ª and spaced vertically therefrom a short distance, is a plate 34 forming the working surface of the machine on which the box blank is placed.

Figure 4:
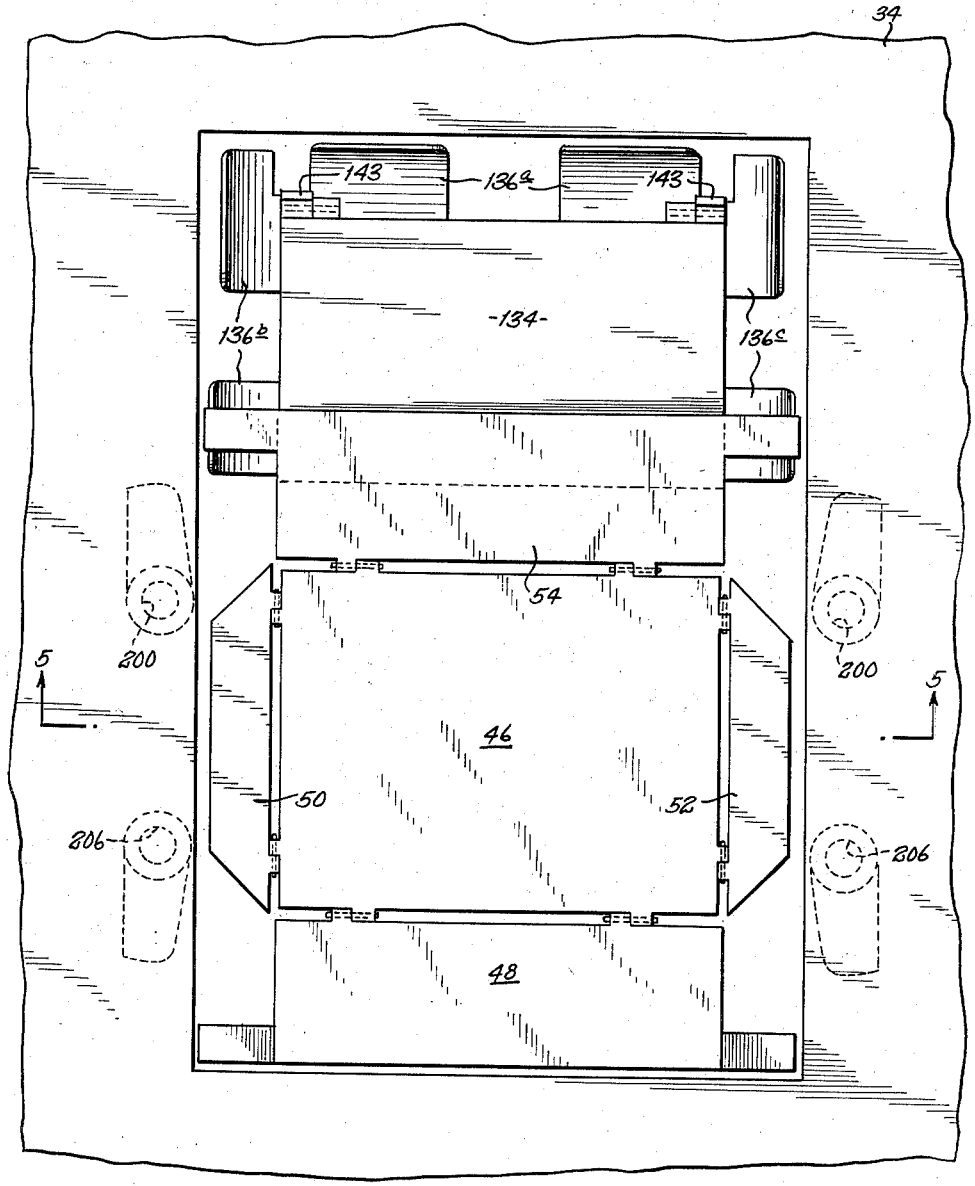
Figure 4 is an enlarged detailed plan view from the line 4—4 of the female shaping portion of the folding mechanism.

The plate 34, see Figure 4, has a rectangular opening in which the female box forming portions are mounted, and which parts at the beginning of the operation lie substantially in the plane of the plate 34. The female die portion for shaping the main body B of the box consists of a central plate 46 having hinged at the edges thereof plates 48 and 54 at the front and back and plates 50 and 52 at the left and right sides thereof. The area and shape of the plate 46 is substantially that of the bottom wall 10 of the box.

As shown in Figures 5 and 7, the plate 46 is supported on four vertically slidable rods. Viewed from the front of the machine the rods are arranged in a pair as shown at 58 and from the side of the machine at 56 and 58. The four rods 56 and 58 are arranged substantially at the corners of the rectangle defined by the plate 46. Associated with the two rods 58 are the compression springs 64 and with the rods 56 the compression springs 62. The rods 56 and 58 are vertically reciprocable in a supporting plate structure 60 which will be seen in Figures 1 and 2. The plate 60 is secured to the standards 36 at the front and to shorter standards, one of which is shown at 36' in Figure 2, the central portion being broken away to reveal parts in back thereof.

Figure 2:
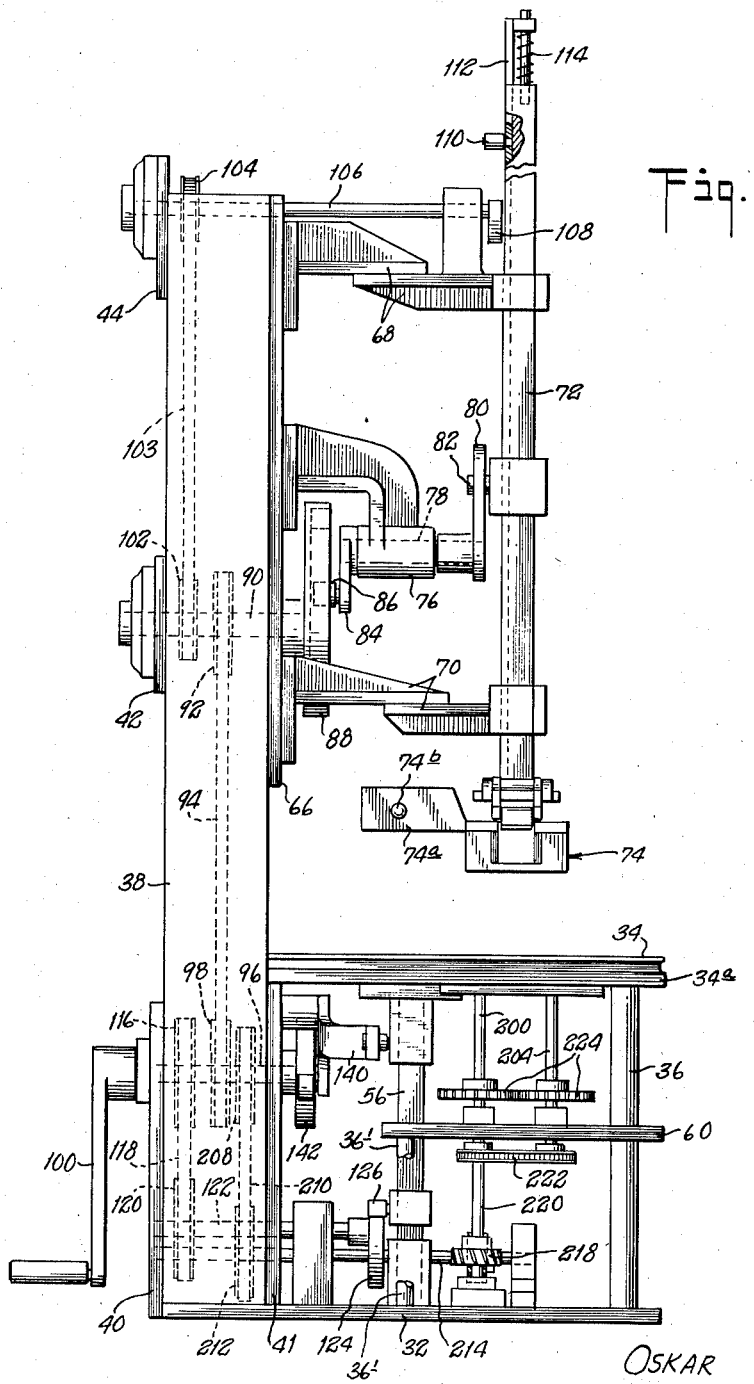
Figure 2 is a lefthand elevational view thereof.

Secured to the front of the standards 38 is a large plate 66, see Figures 1 and 2. Attached on the front of plate 66 are the bracket assemblies 68 and 70 having guides at their ends to permit vertical reciprocation of the rectangular rod 72 to the lower end of which the male forming ram 74 is attached. As shown in Figure 2, the ram has a rectangular rear extension 74ª which cooperates with the female portions of the die to shape the cover C. The main portion of the ram cooperates with the female die to shape the main body portion B of the box. Also secured to the plate 66 is an L-shaped bracket 76 in which is journaled a shaft 74. Secured on the front end of the shaft is a lever 80 having a slot which cooperates with a pin 82 secured to the ram rod 72. On the other end of shaft 78 is a lever 84 which has a cam follower roller 86 cooperating with the cam 88.

Cam 88 is secured at the forward end of a short shaft 90 journaled in bearings on the plates 42 and 66. A sprocket wheel 92 on the shaft 90 is connected by a chain 94 to a sprocket wheel 98 secured on a shaft 96, see Figures 2 and 3. Shaft 96 is journaled in bearings on the plates 40 and 41, the latter plate being secured on the front of the columns 38 at the bottom. Power is applied to the machine at the rear end of shaft 96 by means of a crank 100 in the drawings. For high speed production shaft 96 should be driven from any suitable power source. As shown in Figure 3 the chain 94 passes in contact with an idler sprocket 95.

Also secured to shaft 90, see Figures 2 and 3, is another sprocket 102 which is connected by a chain 103 to a sprocket 104 on the shaft 106. This shaft is journaled in suitable bearings, as shown in Figure 2. Secured to the forward end of shaft 106 is a short cam lever 108 positioned to cooperate with a cam roller 110, see Figure 2, secured to a rod 112 vertically slidable in the ram rod 72. A compression spring 114 normally holds the rod 112 in raised position. As illustrated in Figure 8, the lower end of rod 112 has a lateral extension by means of which it is connected to a fixture 228 slidable on the ram rod 72. As further illustrated in Figure 6, this fixture 228 has relative vertical movement with respect to the main body portion of the ram 74 to perform a function to be described later.

Also secured to the shaft 96, see Figures 2 and 3, is a sprocket wheel 116 which is connected by a chain to shaft 122 by means of a sprocket 120. Secured to the forward end of shaft 122 is a cam 124, Figure 7, which cooperates with a cam follower roller 126 journaled on a collar 128 which is adjustably secured to a vertically reciprocable shaft 130. This shaft is mounted in a sleeve 132 on the base plate 32, and by the plate 60. Secured to the upper end of shaft 130 is a plate 134 which is a part of the female or die portion concerned with the folding of the side walls of the cover. As shown in Figures 7 and 8, a member 136 is vertically slidable on the rod 130 and is provided with a cam roller 138 which cooperates with a bell crank lever 140, see Figures 1 and 2. The bell crank lever 140 is pivotally mounted on the plate 141 intermediate its ends. The other extension of the bell crank lever is provided with a cam follower roller which cooperates with a cam 142 secured to the forward end of the shaft 96.

Pivotally mounted on the fixture 136, see Figures 7, 9 and 10, are a pair of bell crank levers 143 on one end of each of which is an adjustable machine screw 144 connected by a tension spring 146 to the fixture 136, so as to normally induce clockwise rotation of the bell crank lever. Secured to the sides of the fixture 136, see Figures 4 and 7, are a series of vertical camming fingers 136ª, 136ᵇ and 136ᶜ, the upper ends of which are curved outwardly. At this point it may be noted that the female box member forming assembly 134—136 is movable through an opening in the plate 34ª, see Figure 7.

Figure 11:
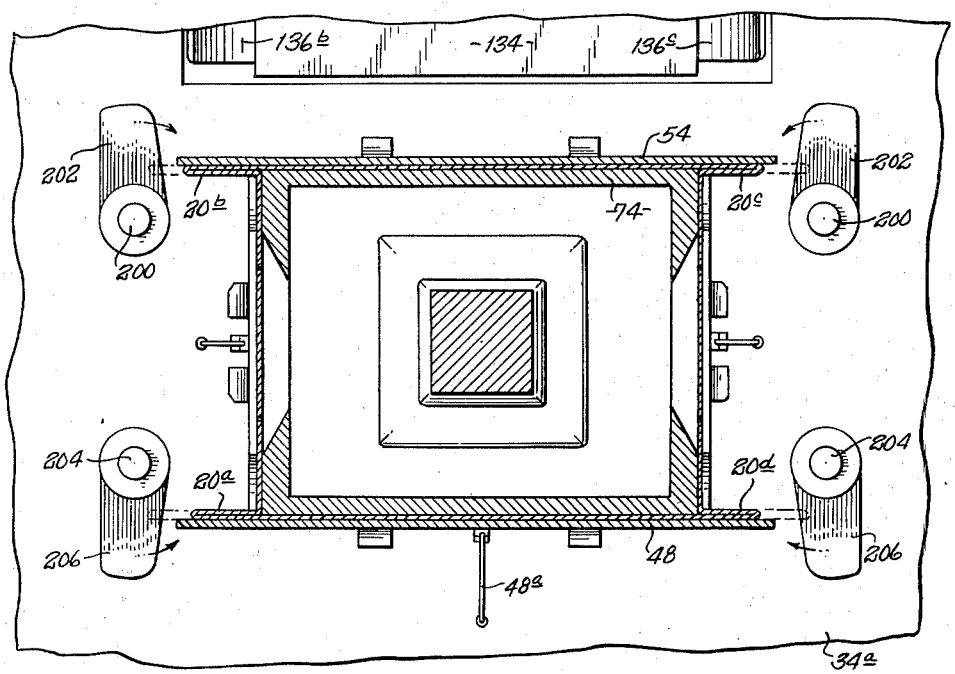
Figure 11 is a cross-sectional view taken on the line 11—11 of Figure 6.

Journaled in bearings in the plates 32 and 60 are a pair of vertical shafts 200, see Figures 2 and 11, on the upper ends of which are a pair of horizontal cam levers 202. Disposed in front of these shafts are a similar pair of vertical shafts 204 having horizontal cam levers 206 on their upper ends. The shafts 200 and 204 are arranged at two corners of a rectangle and are disposed adjacent the corners of the folding die for the main body portion B of the box.

Figure 12:
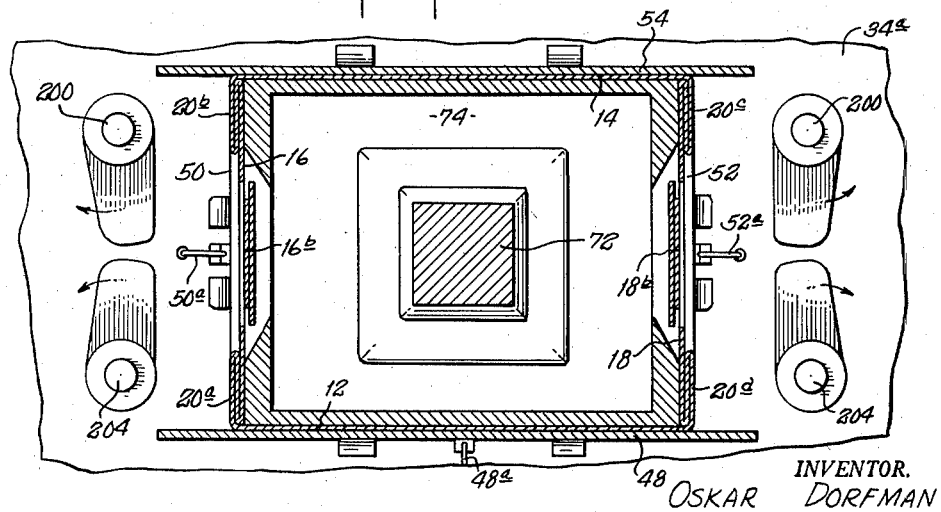
Figure 12 is another view of the structure of Figure 11 at a more advanced stage of operation.

The shafts 200 and 204 are rotated by means of sprocket 208, also secured to the shaft 96, Figures 2 and 3, connected by a chain 210 to a sprocket 212 secured to the horizontal shaft 214. The forward end of this shaft is provided with a worm 216, see Figure 1, meshing with a worm wheel 218 secured to the extension 220 of one of the rear righthand shafts 200 (Figure 12). This shaft is connected with the adjacent shaft 204 by a pair of gears 226. The other pair of shafts 200 and 204 at the left side of the machine, Figure 1, are interconnected by a pair of gears 224. The front shafts 204 extend below the plate 60, see Figure 1, and are provided with sprockets which are interconnected by means of the chain 222.

The main body of the ram 74, see Figure 6, is secured to the lower end of the ram rod 72 and is of rectangular cross-section, see Figure 12, having an outside diameter equal to the inside diameter of the main body portion B of the box. The end walls of this cup shaped ram are provided with openings, as is clear from Figure 12. Pivotally mounted on the ram at the ends 232 are a pair of fingers 230 which are pivotally interconnected by means of links 234 with the fixture 228. It will be recalled that this fixture, see Figure 8, is connected with the vertically reciprocable rod 112.

There are a number of small additional structural details to which reference can best be made in the following description of the operation of the machine.

In operating the machine a foldable carton blank of the form illustrated in Figure 13 which initially is perfectly flat, is laid on top of the table 34 so as to overlie the central opening in the female die members mounted therein, as illustrated for example in Figure 5. In a production machine suitable locating fixture will be associated with the female die members so as to properly center the blank and in a more refined form a suction cup member, not shown, will be mounted in the plate 46 to aid in holding the completed box as the ram is withdrawn from it. When properly positioned the box blank will be centered so that the bottom wall 10 of the blank will be aligned with the central plate 46. Rotation of shaft 96 will rotate cam 88 in an obvious manner. The shape of this cam and the timing is such that lever 80, Figure 1, will be rotated in a counterclockwise direction causing the ram rod 72 and attached ram assembly 74—74ª to descend.

The configuration of the main portion of the ram and its dimensions are such that it will first engage the bottom wall 10 of the box blank and apply pressure to the die plate 46 to cause it to move down against the resistance of springs 62 and 64, see Figure 7. More specifically, it will be seen that the peripheral dimensions of the ram 70 are the same as the internal peripherial dimensions of the main body portion B of the box. As the ram 74 continues downwardly it will depress the female die assembly causing it to descend to the position shown in Figure 8. As these parts move downwardly the hinge plates 48 and 54 will engage the cam pieces 34ᶜ secured to the plate 34ª, Figure 8, and the cam pieces 34ᵇ similarly supported but positioned so as to engage the hinged plates 50 and 52, see Fig. 5. Thus, as the female die assembly descends the plates 48, 50, 52 and 54 will gradually be moved up into a right angle position with respect to the central plate 40, as clearly shown in Figure 8. As the female die assembly descends the springs 62 and 64 will be compressed in an obvious manner.

During these operations the rod 130, see Figure 7, will begin to move upwardly so as to ultimately clamp the wall 22 of the cover section C between it and the rear extension 74ª of the ram 74, see Figure 8. As soon as the wall 22 is thus clamped the fixture 136 will move upwardly on the rod 130 through the driving action of the bell crank 140 causing the camming fingers 136ª and 136ᶜ to engage the extensions 24, 26 and 28 of the wall 22 and fold them up about the ram extension 74ª which is box shaped at its outer end. It will be noted that the end wall 74' of this box shaped formation lies at an acute angle with respect to the vertical so that on the final relative movement between fixture 136 and the plate 134, the screw 144 will be engaged by the plate 134, pivoting the bell crank lever 142 to the position shown in Figure 8, so that the box wall 28 will be moved beyond a right angle with respect to the wall 22. This is for the purpose of causing the hook shaped extensions 30ª on the wall 28 to enter the slot formed by the tabs 24ª, see Figure 9, to move well within the slits formed therein. To facilitate this insertion of the hooked ends of the flaps 30ª, the sides of the box-like ram extension are provided with dimples 74ᵇ, which as shown in Figure 10, will cause the flaps 24ª defined by the angular slits to stand out a sufficient distance so that the extensions 30ª can easily enter through the slits.

At this point it may be noted that there are a pair of these bell crank levers 142, and of course, a pair of the dimples 74ᵇ, all as appears from Figure 10. Shortly thereafter, when the plate 134 moves away from the fixtures 136, the springs 146 will pull the bell crank levers 142 away from the wall 28 which wall will then naturally spring back causing the hooked ends of the flaps 30ª to lock in place.

While this is going on the camming levers 202 and 206, see Figure 11, are being rotated through the drive connections previously described, towards the triangular corner extensions of the main part B of the box, namely the extensions 20ª, 20ᵇ, 20ᶜ and 20ᵈ, see Figure 11. The front and back die walls 48 and 54 are shaped, see Figure 4, so that these levers can move into engagement with these flaps and bend them around into the position shown in Figure 12. The rate of movement of the camming levers is such that their ends engage the flaps 20ª and 20ᵈ and hold them tightly against adjacent end walls of the box while the extensions 16' and 18' are folded down and locked in the manner illustrated in Figure 6. This folding operation is accomplished through the rod 112 and the cam lever 108, see Figure 1. This lever is rotated in proper timed relation so that it swings around in a counterclockwise direction to engage the cam follower roller 110, see Figure 2, after the ram is fully depressed. When the lever 108 engages the roller 110, rod 112 moves downwardly causing the fixtures 228 to move down with respect to the stationary ram 74.

As a result of this relative movement, the fingers 230, Figure 11, are pivoted inwardly to fold the extensions 16' and 18' against the adjacent end walls of the box. It will be noted that the end walls are supported by the die plates 50 and 52 and the ram 74 up close to the slits in the walls so that upon the completion of the swinging movement of the fingers 230, the extensions 16ᵇ and 18ᵇ on the locking flap 16' and 18' are snapped through the slits 16ª and 18ª and are locked in place as illustrated in dotted lines in Figure 6. During this interval the cam levers 202 and 206 hold the corner flaps against adjacent end walls of the box. When cam lever 108 disengages the follower 110, spring 114, see Figure 1, causes the rod 112 to return to its original position moving fixture 228 away from the ram body 74, thus swinging the fingers 230 back to inactive position.

The timing of the machine is such that the ram then begins its bodily movement upwardly, and of course the cam levers 202 and 206 move out of the way. As the ram moves upwardly, the female die assembly moves upwardly, and as a result the hinged die plates 48, 50 and 52 are caused to gradually move back to planar position under the control of the fixed cams 30ª and 30ᵇ and the spring loaded levers 48ª, 50ª and 52ª respectively, see Figures 5 and 8.

When the female die assembly reaches its upper limit of movement, further continued movement of the ram causes its withdrawal from the main body portion B of the box. In a commercial machine, a suction cup or other fixture will be associated with the portion B to hold it on the plate 46, as the ram is withdrawn. The withdrawal of the ram also causes the extension 74ª to be withdrawn from the cover portion C of the box. During this operation the rod 130, see Figure 8, also returns to its normal position, as shown in Figure 7, and the timing is such that associated fixture 136 and attached parts is moved downwardly with respect to the plate 134 on the rod 30 to return this fixture to normal position. The box is then removed and replaced with a new blank to repeat the operations thus described.

Figure 16:
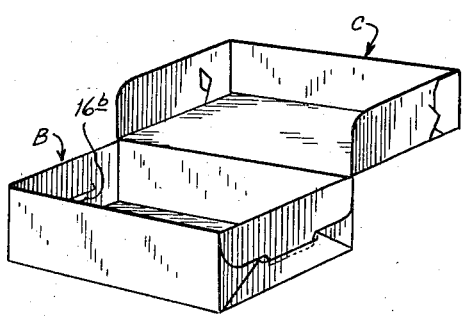

For emphasis it may be noted that the flaps 16' and 18' fold over the corner extensions 20ª, 20ᵈ and hold them in position, as clearly illustrated in Figure 16.

From the above description it will be apparent to those skilled in the art that the subject matter of this invention is capable of many changes in detail without departing from the real substance thereof. It is preferred, therefore, that the within disclosure be taken in an illustrative sense, and that the scope of the invention be determined by the appended claims.

What is claimed is:

1. A machine for folding a box blank into a box, comprising a normally flat female die having a central plate and four side plates hinged to the respective sides of said central plate, means including a ram for moving said side plates to right angle relation with said central plate to form a box blank held between said ram and central plate into a box having double-ply corner flaps, means adjacent each corner of said central plate for folding the double-ply corners of the folded blank against the adjacent end faces of the formed box, and means for folding a marginal extension of each end wall of the box outwardly to overlie said folded corners.

2. In the combination of claim 1, said central plate being movably supported, and means for causing said side plates to assume simultaneously said right angle relationship when said central plate is moved by said ram.

3. In the combination of claim 1, means for inserting a tab on the edge of each end wall extension into a slit in the adjacent end wall.

4. In the combination of claim 1, said last means comprising pivoted fingers mounted on said ram.

5. In the combination of claim 1, said last means comprising pivoted fingers mounted on said ram, said ram having recesses adjacent a slit in each end wall of said box whereby said fingers open each said slit and insert a tab on the marginal edge of each extension into the adjacent slit.

6. In the combination of claim 1, said ram having two relatively movable parts, one part engaging the box blank and said last means comprising pivoted fingers mounted on said other part, and means for effecting relative movement of said ram parts.

7. In the combination of claim 1, said ram having a lateral extension, a ram assembly mounted for movement with respect to said extension on an axis parallel to said ram, means for effecting movement of said assembly whereby a portion of the box blank is folded to form a cover for the formed box, said cover end walls having slits, and means forming part of said ram assembly for tucking the ends of said corners into said slits.

References Cited in the file of this patent

UNITED STATES PATENTS

| | | |
|---|---|---|
| 432,028 | Foglesong | July 15, 1890 |
| 1,000,991 | Comings | Aug. 22, 1911 |
| 2,697,968 | Cote et al. | Dec. 28, 1954 |